United States Patent [19]
Lebert et al.

[11] Patent Number: 6,128,197
[45] Date of Patent: Oct. 3, 2000

[54] ELECTRONIC DEVICE COMPRISING AN ACCUMULATOR AND A POWER SUPPLY CONTACT AND EQUIPMENT INCLUDING SUCH A DEVICE

[75] Inventors: Philippe Lebert, Le Mans; Arnaud Flegeo, Challes, both of France

[73] Assignee: U.S. Philips Corporation, New York, N.Y.

[21] Appl. No.: 09/096,427

[22] Filed: Jun. 12, 1998

[30] Foreign Application Priority Data

Jun. 17, 1997 [FR] France .................................. 97 07511
Mar. 13, 1998 [FR] France .................................. 98 03138

[51] Int. Cl.$^7$ ...................................................... H05K 7/12
[52] U.S. Cl. ........................... 361/752; 361/814; 320/21; 455/99; 439/76.1
[58] Field of Search .................................. 361/752, 814; 320/21; 455/99, 127; 439/76.1

[56] References Cited

U.S. PATENT DOCUMENTS

| | | | |
|---|---|---|---|
| 5,235,492 | 8/1993 | Humbert et al. | 361/818 |
| 5,258,892 | 11/1993 | Stanton et al. | 361/814 |
| 5,577,269 | 11/1996 | Ludewig | 455/90 |
| 5,664,973 | 9/1997 | Emmert et al. | 439/862 |
| 5,749,754 | 5/1998 | Patterson et al. | 439/76.1 |

FOREIGN PATENT DOCUMENTS

| | | | |
|---|---|---|---|
| 2262864A | 6/1993 | United Kingdom | H04B 1/034 |
| WO9804018 | 1/1998 | WIPO | H01R 13/24 |

*Primary Examiner*—Leo P. Picard
*Assistant Examiner*—Hung Van Duong
*Attorney, Agent, or Firm*—Dicran Halajian

[57] ABSTRACT

The invention discloses a device for realizing a power supply contact between printed circuits on a printed circuit board and a current source. The device includes a casing and an electronic board which has a metallic surface connected to a power supply contact, on the one hand, and to circuits to be supplied with electric power on the other. The printed circuit board is kept on the casing by at least one securing means secured to the printed circuit board on the metallic surface and secured to the casing on a securing surface. The securing means has a conducting part between the power supply contact and the metallic surface for leading the power from the power supply contact to the circuits to be supplied with power.

6 Claims, 3 Drawing Sheets

ELECTRONIC DEVICE COMPRISING AN ACCUMULATOR AND A POWER SUPPLY CONTACT AND EQUIPMENT INCLUDING SUCH A DEVICE

DESCRIPTION

1. Field of the Invention

The invention relates to a device comprising a casing and an electronic board having a metallic surface connected to a power supply contact, on the one hand, and to electric power supply circuits on the other, the board being kept firmly secured to the casing by at least one securing means.

The invention likewise relates to electronic equipment including such a device.

The invention is notably applied to any portable electronic equipment including electronic circuits which are to be fed with electric power by means of an accumulator. The invention is particularly applied to radio telephones fed by a rechargeable battery.

2. Background of the Invention

Patent document published under no. GB 2 262 864 A describes a device comprising a printed circuit on a board and fed by battery leads connecting to the circuit by clamps. The board is secured to a casing by screws. The securing to the casing and the power supply contact are thus realized by separate elements: screws and clamps.

3. Object of the Invention

It is an object of the invention to provide a device which is inexpensive to manufacture thanks to a simplified arrangement and a reduced number of elements. Cited document provides the use of screws for securing the board to the casing and clamps connected to the circuits to be supplied with power and to the battery leads for realizing a power supply contact. The invention proposes to unite these two functions of securing and power supply contact in a single means. For this purpose, a device of the type defined in the opening paragraph is characterized in that the power supply contact is realized by the securing means.

According to an interesting characteristic feature of the invention, the securing means is arranged on said metallic surface, on the one hand, and on a securing surface of the casing on the other, and has a conductive part between the securing surface and the metallic surface for realizing said power supply contact. In this manner, the two functions of securing and power supply contact are united which, moreover, permits to save room on the board.

According to a first embodiment of the invention, the securing means has a screw with a head, a contact washer for making the electrical contact between the metallic surface and the head and a threaded pin for allowing it to be screwed into the casing. The power supply contact is thus realized between the head of the screw and the metallic surface.

According to a second embodiment of the invention, the casing has an outside face forming an electrical contact surface and an inside face, said faces being connected to each other through an orifice which opens onto the electrical contact surface, on the one hand, and onto the securing surface on the other, and said power supply contact is formed by a metallic layer of said securing means and the orifice for realizing an electrical contact through said orifice between the electrical contact surface and the metallic surface. Here, the contact surface surrounding the orifice plays the role of the head of the screw for forming the power supply contact.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 2:
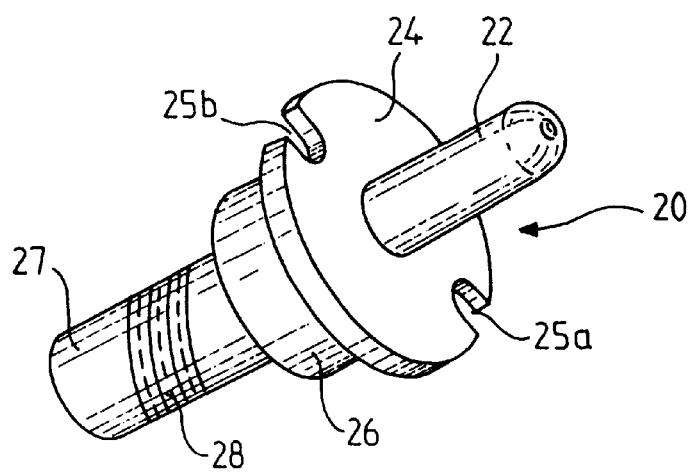
FIG. 2 represents an embodiment of a means according to the invention for ensuring a twofold function of securing means and power supply contact in the device shown in FIG. 1.
Figure 3:
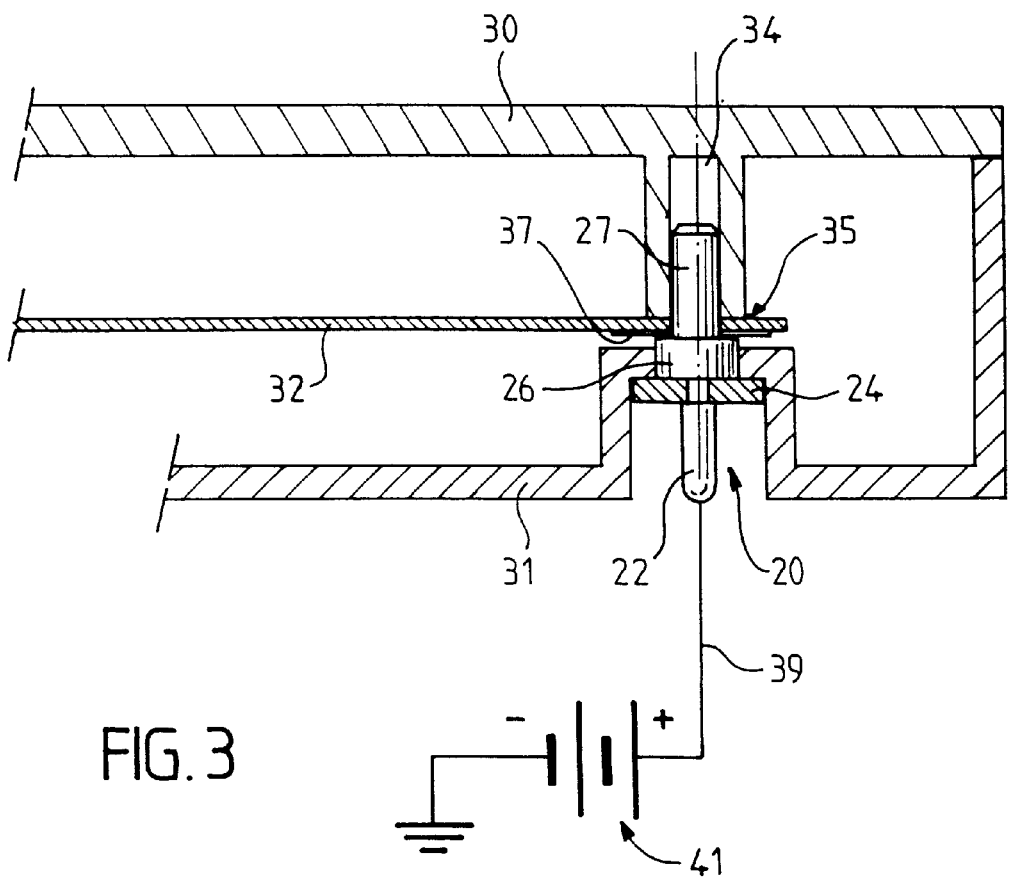
FIG. 3 depicts a first embodiment of the invention incorporating the means represented in FIG. 2.
Figure 4:
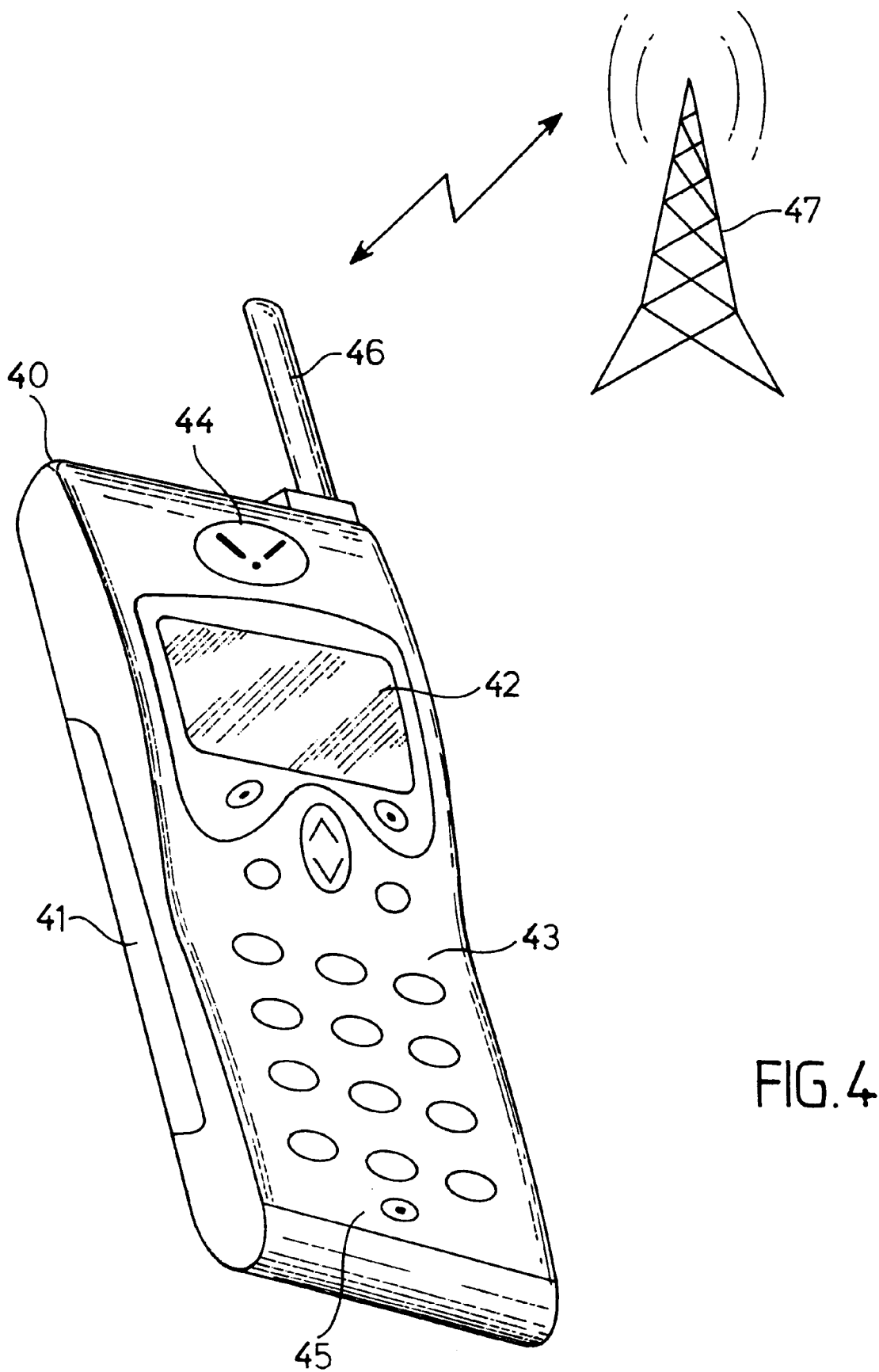
FIG. 4 is an example of an application of the invention in accordance with the first embodiment.
Figure 5:
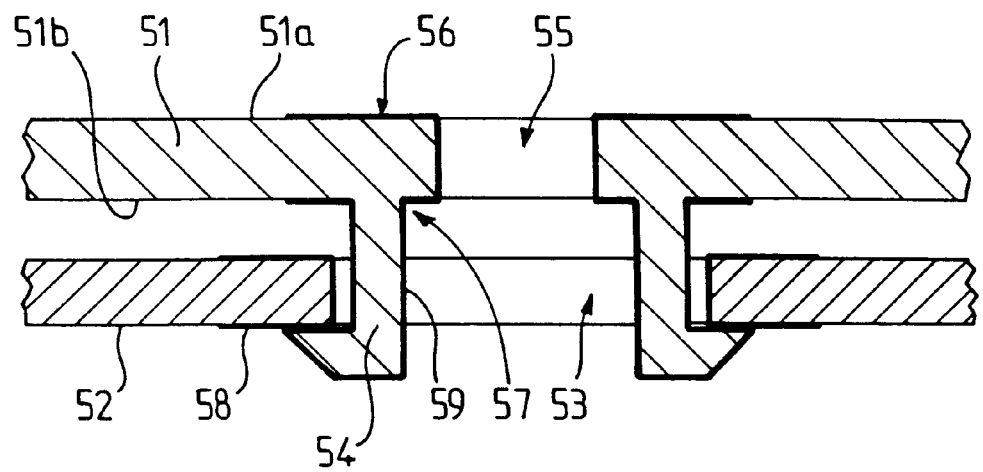
FIG. 5 depicts a second embodiment of the invention.

FIGS. 1 to 4 show devices for realizing a power supply contact between a current source and circuits to be supplied with power. Two types of application of these devices will be described. In the first type, the current source may be a battery or an accumulator which, when charged, supplies power to electronic circuits (FIG. 4). In the second type, the current source is a recharging device currently called charger for recharging an accumulator which includes circuits to be supplied with electric power (FIG. 5).

Figure 1:
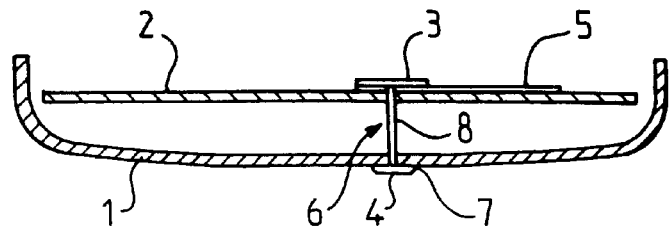
FIG. 1 diagrammatically shows a device according to the invention.

In FIG. 1 is shown a very simple device comprising all the essential elements of the invention. It has a casing 1 and an electronic board 2 on which a metallic surface 3 is connected to a power supply contact 4 and to circuits 5. These circuits are supplied with electric power by a current source (not shown) via the power supply contact 4 and the metallic surface 3. The board 2 is kept firmly secured to the casing 1 by a securing means 6 mounted on the metallic surface 3, on the one hand, and to a securing surface 7 of the casing 1 on the other. The securing means 6 includes a conductive part 8 between the securing surface 7 and the metallic surface 3 to realize said power supply contact 4.

Other securing means may be provided, but do not form part of the invention. The power supply contact 4 is thus realized by the securing means 6 which ensures an electrical contact with the metallic surface.

FIG. 2 represents an embodiment of the securing means 6 formed by a screw of conductive material (for example, of steel or brass) for conducting the power received at a current source (for example, a supply battery) to circuits of the electronic board. Although the example described shows a screw here, any other securing means which is capable of conducting the electric power could be used.

The conduction is rendered possible here by mounting the metallic screw against a conductive surface of the board, preferably of metal. The screw may be simply covered by a metal layer in its upper part which realizes the electrical contact. For realizing the power transfer from the battery to the electronic circuits, two contacts are further used, one for each pole of the battery. The ground contact does not form part of the invention.

The screw 20 represented in the FIG. 2 has:

a head 22 intended to establish the power supply contact with the electric current source, a pressure washer 24 for keeping part of the casing against the board, this washer being pierced by two small slots 25a and 25b for allowing the screw to be turned with the aid of a special tool, a contact washer 26 having a smaller diameter than that of the pressure washer 24, intended to establish the electrical contact with a conductive part of the board, a pin 27 having an ISO thread 28 for allowing it to be screwed into the casing.

FIG. 3 shows a simplified cross-sectional view of a first embodiment of the invention including the screw 20. The housing 1 is shown diagrammatically by two frame halves 30 and 31 made of an insulating material. They are put together for sandwiching the board 32. The frame half 30 has a screw gap 34 intended to receive the threaded pin of the screw and a contact surface 35 intended to stop against a face of a part of the board 32, this part being pierced by a hole for being passed through by the threaded pin.

The frame half 31 has a shoulder intended to receive the pressure washer 24 which, with the aid of the combination of screw gap 34/threaded pin 27, permits to keep the board 32 firmly secured to the casing 30, 31. The screw thus carries out a function of securing the electronic board to the casing. For its function of power supply contact, the screw utilizes a conductive area 37 of the board 32 connected to the electronic circuits to be supplied with power.

Actually, when the screw is tightened, while the washer 24 exerts a pressure on the frame half 31, the board 32 is sandwiched between the frame half 30 and the metallic washer 26 which thus effects an electrical contact with the conducting area 37 of the board. As the head of the screw 22 is connected to the battery lead 39 corresponding to the positive pole of the battery 41, the battery power is led through the head 22, the washers 24, 26 and the area 37 to the circuits of the board 32 which are to be supplied with power.

An example of an application of this embodiment is represented in FIG. 4. It relates to a radio telephone, but the invention may be applied to any other electronic device operating with supply batteries.

The radio telephone has a casing 40, a supply battery 41 and electronic integrated circuits (not shown) on a printed circuit board situated inside the casing 40. A display 42, a keyboard 43, an earphone 44 and a microphone 45 ensure the interface with the user. A transceiver circuit also integrated with the printed circuit board cooperates with an antenna 46 for exchanging radio signals with the base site 47.

The printed circuit board is secured to the casing 40 by the screw 20 which keeps the printed circuit board tightened between two frame halves of the casing as illustrated in FIG. 3 and at the same time realizes the power supply contact of the battery.

FIG. 5 represents another embodiment which does not utilize screws but one or more clips, preferably of plastic, to facilitate the mounting of the board on the casing. Actually, a forced mounting of the board on the clip is simpler to execute automatically than using screws which makes a more perfected tool necessary. Another advantage of this embodiment is that it may be used for recharging an accumulator. In that application, the power supply contact is realized between the accumulator and its recharger.

FIG. 5 represents a partly cut-away view of a casing 51 and an electronic board 52 pierced by an opening 53, the cutaway drawing passing through this opening. The board 52 is kept on the casing 51 by a plastic clip 54 of which the bent end is inserted into the opening 53 for retaining the board 52. The casing has an outside face 51a and an inside face 51b connected to each other by an orifice 55 ending on either one of the two sides in an electrical contact surface 56 and on a securing surface 57 of the inside face.

The plastic clip 54 is secured to the securing surface 57, on the one hand, and to a metallic surface 58 of the board on the other. It is covered by a metallic layer 59 running from the metallic surface 58 to the contact surface 56 through the orifice 55. The metallic layer 59 may be obtained by electrolytic deposition of metallized paint or by any other equivalent means.

Figure 6:
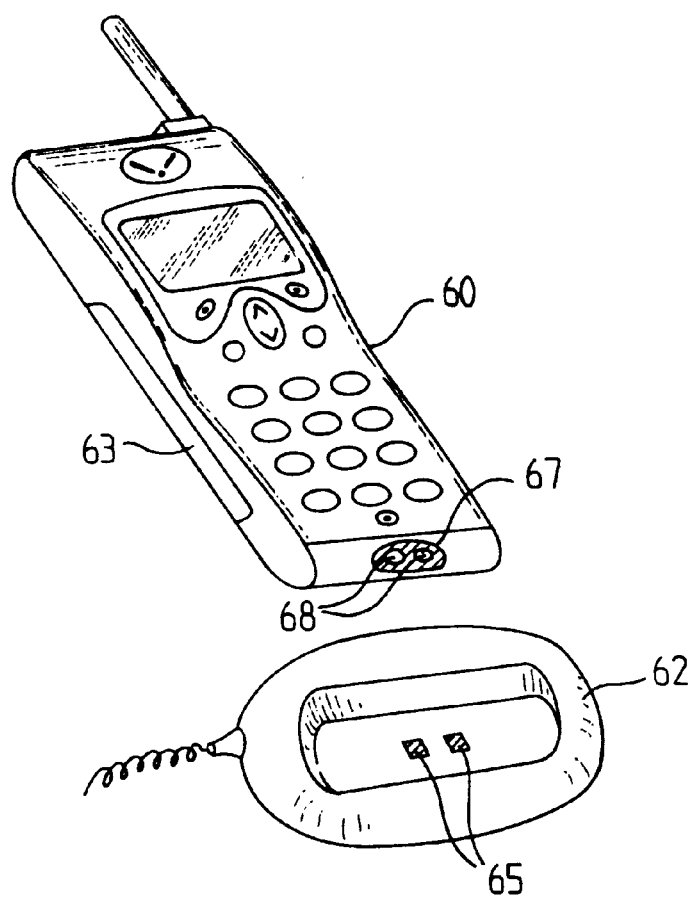
FIG. 6 is an example of an application of the invention in accordance with the second embodiment.

FIG. 6 represents a casing of a radio telephone 60 and its charger 62 in accordance with the embodiment shown in FIG. 5. The radio telephone 60 has a battery 53 which can be recharged with the aid of the charger 62. In this embodiment, the power supply contact is realized by two supply contacts, but this number is not restrictive. Indeed, the transfer of the electric power and data between the charger and the radio telephone often makes it necessary to have a plurality of connection terminals in accordance with the intended applications. The recharging takes place by transferring electric power from the supply contacts 65 of the charger 62 to supply leads (not shown) of the battery 63. The transfer is effected by means of a contact surface 67 connected electrically along inside walls of the orifices 68, to a metallic support inside the casing 60 to which are connected the supply leads of the battery. The metallic support (or area) is found on an electronic board secured to the casing in accordance with the embodiment represented in FIG. 5.

Thus, a description has been given of an inexpensive electronic device, easy to install and having multiple applications in the domain of portable electronic devices. Obviously, the invention is not restricted to the embodiments that have just been described and represented. Variants of embodiments of the invention will be evident to a person of ordinary skill of the art, while these variants do not go beyond the scope of the invention.

What is claimed is:

1. A device comprising a casing and an electronic board having a metallic surface connected to a power supply contact and to electric power supply circuits, the electronic board being kept firmly secured to the casing by at least one securing means, wherein the power supply contact is realized by the securing means, the securing means being arranged on said metallic surface and on a securing surface of the casing, wherein the securing means has a conductive part between the securing surface and the metallic surface for realizing said power supply contact;

wherein the casing has as an outside face forming an electrical contact surface and an inside face, said outside face and said inside face being connected to each other through an orifice which opens onto the electrical contact surface and onto the securing surface; and wherein said power supply contact is formed by a metallic layer of said securing means and the orifice for realizing an electrical contact through said orifice between the electrical contact surface and the metallic surface.

2. The device as claimed in claim 1, wherein the securing means has a screw with a head, a contact washer for making the electrical contact between the metallic surface and the head, and a threaded pin for allowing the screw to be screwed into the casing.

3. The device as claimed in claim 1, wherein the securing means has a clip of plastic material clad by the metallic layer.

4. The device as claimed in claim 1, wherein said metallic layer is formed by electrolytic deposition of metallized paint.

5. Electronic equipment including a device as claimed in claim 1 and an accumulator for supplying electric power.

6. Electronic equipment including:

a device as claimed in claim 1, said electric power supply circuits to be supplied with power being connected to an accumulator intended to be recharged with a recharging electric power, a recharging casing having supply contacts for supplying said recharging electric power, conduction means for conducting the recharging electric power from the supply contacts to a receiving electrical contact surface of said electronic equipment, wherein said conduction means are realized by bringing said receiving electric contact surface into mechanical contact with said supply contacts.

* * * * *